United States Patent [19]

Confer et al.

[11] 4,193,179

[45] Mar. 18, 1980

[54] PROCESS OF MANUFACTURING AN ARTICLE HAVING A GROOVE ROLLED THEREIN, AND AN ARTICLE PRODUCED THEREBY

[75] Inventors: Howard F. Confer, Bloomfield Hills; Daniel C. Confer, Royal Oak, both of Mich.

[73] Assignee: Condor Manufacturing Inc., Warren, Mich.

[21] Appl. No.: 851,395

[22] Filed: Nov. 14, 1977

[51] Int. Cl.² .................. B23P 15/10; B21H 7/18
[52] U.S. Cl. .................. 29/156.5 R; 29/527.4; 72/107; 72/110; 92/208; 188/72.4
[58] Field of Search ........... 29/527.4, 527.2, 156.5 R, 29/DIG. 32; 72/107, 110, 105, 106; 92/208; 188/72.4, 72.5, 370, 71.1

[56] References Cited

U.S. PATENT DOCUMENTS

| 1,061,922 | 5/1913 | Patrick | 29/156.5 R |
|---|---|---|---|
| 1,293,916 | 2/1919 | Pribil | 29/156.5 R |
| 1,717,750 | 6/1929 | Wills | 29/156.5 R |
| 1,788,359 | 1/1931 | Ross | 29/156.5 R |
| 1,854,455 | 4/1932 | Day | 29/156.5 R |
| 1,956,001 | 4/1934 | Brown | 29/156.5 R |
| 2,748,634 | 6/1956 | Koehring et al. | 72/107 |
| 3,358,349 | 12/1967 | Rosen | 29/156.5 R |
| 3,500,967 | 3/1970 | Nolan | 188/72.4 |
| 3,506,098 | 4/1970 | Anders | 188/72.4 |
| 3,528,271 | 9/1970 | Di Ponio | 72/108 |
| 3,712,099 | 1/1973 | Elsbett et al. | 29/156.5 R |
| 3,882,972 | 5/1975 | Newstead et al. | 188/72.5 |
| 3,995,466 | 12/1976 | Kunsman | 72/106 |
| 3,999,416 | 12/1976 | Brooks | 72/105 |
| 4,047,414 | 9/1977 | Druge et al. | 72/105 |

FOREIGN PATENT DOCUMENTS

| 701881 | 1/1941 | Fed. Rep. of Germany | 29/156.5 R |
|---|---|---|---|
| 577379 | 6/1924 | France | 29/156.5 R |

*Primary Examiner*—Daniel C. Crane
*Attorney, Agent, or Firm*—Irving M. Weiner; Pamela S. Burt; Melvin Yedlin

[57] ABSTRACT

A process for making a light-weight, heavy duty steel piston for a disc brake. The initial blank is formed to include the piston nose radii and angle. The blank is then simultaneously rolled by three rollers, one of which rollers forms the piston boot groove, another of which rollers maintains the outer diameter of the main portion of the piston, and the other roller of which forms near the outer end of the piston an overall diameter which is less than the main overall diameter. During the rolling step, the metal deforms to form a contour opposite the base of the piston boot groove such that the thickness of the wall between the contour and the base of the piston boot groove is smaller than the thickness of the main portion of the wall, but yet is strong enough to withstand heavy duty disc brake operation throughout the life of the disc brakes.

8 Claims, 5 Drawing Figures

PROCESS OF MANUFACTURING AN ARTICLE HAVING A GROOVE ROLLED THEREIN, AND AN ARTICLE PRODUCED THEREBY

The present invention relates generally to a process of making an article having a depression rolled therein, and an article formed by such process.

More particularly, the present invention relates to a process for manufacturing a lightweight heavy duty steel piston for a disc brake, and a piston manufactured by such process.

BACKGROUND OF THE INVENTION

The disc brake is a friction device which has been frequently used for slowing down and stopping a moving vehicle. The rotating friction surface of a disc brake is a flat, circular plate. Brake shoes are positioned on both sides of the plate and push against the plate or disc when activated. Most disc brake shoes are operated by hydraulic fluid pushing against one or more pistons, which in turn force the disc brake shoes against the sides of the disc. Thus, the braking pressure applied to the disc is brought about by pistons which force the disc brake shoes against the disc. The pistons move inside cylinders which are machined inside a casting called a caliper.

Conventionally, the piston is hollowed for much of its length in order to reduce piston weight and to provide a convenient method for piston removal. Depending on the caliper design, grooves are conventionally machined in the outside of the piston to provide a seat for either the dust boot, the piston seal, or both.

Because such pistons are subjected to repeated large forces and pressures, they must be fabricated from very hard material. Some prior art brake disc pistons have been fabricated from heavy duty steel. However, this presents problems in that the machining of the piston boot groove is an expensive and time consuming operation. Moreover, the cost of steel has risen greatly, and thus it has become abundantly desirable to produce a lightweight piston which is cheap, strong, saves metal, and yet withstands the repeated pressures and forces to which the piston will be exposed throughout the life of the disc brakes.

At least one prior art attempt primarily towards meeting the rising cost of steel has been to try to fabricate a brake disc piston from very hard plastic material. The machining of the piston boot groove in such plastic material is somewhat easier than machining in heavy duty steel, but it has been found that such plastic brake disc pistons have burned up and/or melted during actual use and tests. Moreover, the cost of plastic material is also rising because of the increased cost in petroleum from which the plastics are derived.

The present invention avoids the shortcomings and disadvantages of the prior art techniques, processes and developments, and yet achieves a lightweight, heavy duty steel brake disc piston which is cheaper and faster to manufacture.

SUMMARY OF THE INVENTION

The present invention provides a process of manufacturing an article, including the step of making an article blank which includes at least one substantially curvilinear wall member having a first substantially curvilinear surface and a second substantially curvilinear surface disposed substantially opposite to the first substantially curvilinear surface. Thereafter, the process includes the step of rolling at least one depression in a first predetermined area of the first substantially curvilinear surface of the substantially curvilinear wall member while permitting a second predetermined area of the second substantially curvilinear surface to deform to predetermined dimensions during the rolling step. The second predetermined area of the second substantially curvilinear surface is disposed substantially opposite to the first predetermined area of the first substantially curvilinear surface. The process also includes the step of controlling the dimensions of the article blank during the aforesaid rolling step.

The present invention also provides an article produced in accordance with the aforementioned process.

A primary object of the present invention is a process for manufacturing a piston for a disc brake wherein the piston boot groove is rolled into the piston.

Another object of the invention is to provide a lightweight, heavy duty steel disc brake piston which is cheaper and faster to manufacture than previous disc brake pistons.

A further object of the present invention is to provide a process for manufacturing a piston of the aforementioned type wherein the piston nose radii and angle are free of tool marks, nicks, projections, die marks, flat spots, rough plating, or any surface imperfections which could result in damage to the hydraulic seal during assembly such that subsequent leakage could occur in service.

An additional object of the present invention is to provide a process for manufacturing an article wherein a groove or depression is rolled therein while controlling the deformation and dimensions of the material of the article being rolled.

Another object of the invention is to provide a process of the aforementioned type wherein simultaneous with the rolling of such depression or groove there is also applied additional rollers to the periphery of the article to maintain and/or attain various different outer dimensions.

Another object of the invention is to provide a piston for a disc brake having a novel shaped transverse portion with varying thickness which separates two open-ended hollow portions of such piston.

Other objects and advantages of the present invention will become apparent to the artisan from the following description and attached drawings which form a part thereof.

DETAILED DESCRIPTION OF SOME EMBODIMENTS OF THE PRESENT INVENTION

For illustrative purposes only, a preferred embodiment of the present invention will be described in connection with manufacturing a piston for a disc brake wherein the piston is fabricated from heavy duty steel, such as SAE-1006 steel. The invention of course embraces more general aspects than the particular features of the preferred embodiment described hereinbelow.

Figure 1:
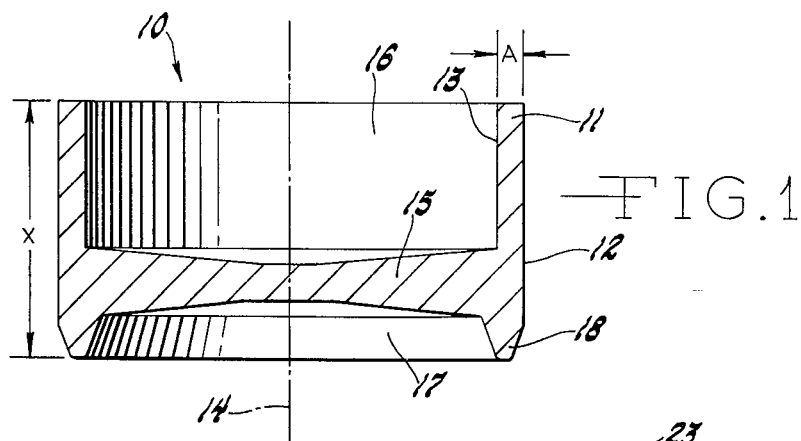
FIG. 1 illustrates an elevational view taken along a central cross-section of an article blank formed in an initial step of the process according to the present invention.

A first step in the novel process is the making of an article blank, such as the piston blank 10 depicted in FIG. 1. Piston blank 10 may be formed, for example, as a cold impact extrusion or a stamping.

Blank 10 includes at least one substantially curvilinear wall member 11 having a first substantially curvilinear surface 12 and a second substantially curvilinear surface 13 disposed substantially opposite to the surface 12. Surfaces 12 and 13 are concentric with respect to a central axis 14.

Blank 10 is provided with a novel-shaped transverse portion 15 which separates a large hollow open-ended portion 16 from a small hollow open-ended portion 17. The transverse portion 15 will be described in greater detail hereinbelow in connection with the description of the final product depicted in FIG. 3.

It should be noted that blank 10 has a wall thickness A for wall member 11, and has an overall first predetermined dimension X parallel to central axis 14. To further avoid as much subsequent machining operations as possible, blank 10 is initially formed with a piston nose 18 having the appropriate piston nose radii and piston nose angle.

The subsequent steps in the novel process, namely the rolling step and the controlling of the dimensions step, will now be described with reference to FIG. 2.

A first roller 19 having a flat end portion 20 rolls at least one depression, such as piston boot groove 21, in a first predetermined area of surface 12 while permitting a second predetermined area of surface 13 to deform to predetermined dimensions during the rolling step. The second predetermined area, which is shown most clearly in FIG. 4, is disposed substantially opposite to the first predetermined area in which the groove 21 is rolled.

Because of the stresses and pressures generated during the rolling of groove 21, there is simultaneously applied to blank 10 a second roller 22 and a third roller 23. The simultaneous rolling of rollers 19, 22 and 23 not only fashions the blank 10 to have the desired shapes, but also controls the dimensions of blank 10 and the deformation of the steel of which the blank 10 is composed.

Figure 2:
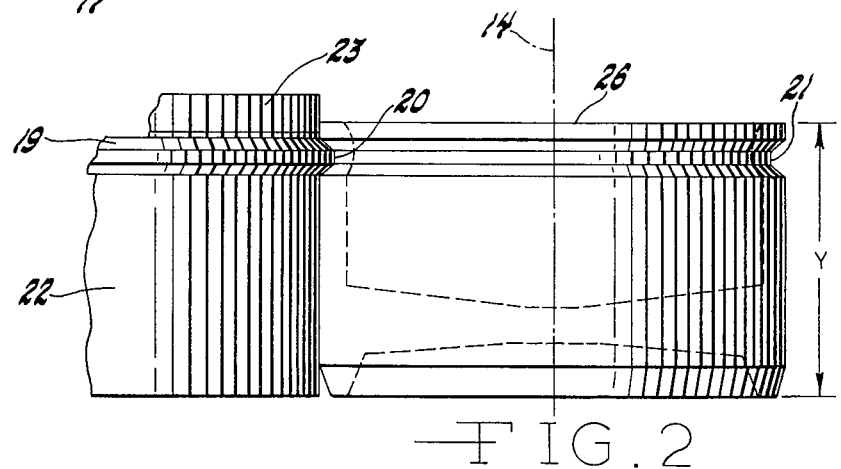
FIG. 2 illustrates the rolling and controlling steps of the process according to the present invention.

As shown in FIG. 2, during the rolling step, there is simultaneously applied to surface 12 the first roller 19, the second roller 22, and the third roller 23. The first roller 19 is applied to surface 12 to form the groove 21 in wall member 11. The second roller 22 is disposed to one side of first roller 19 and is applied to a portion of surface 12 to maintain a first predetermined diameter I (see FIG. 3) of surface 12 during the rolling step. The third roller 23 is disposed to the opposite side of first roller 19 and is applied to another portion of surface 12 to produce therein, during the rolling step, a second predetermined diameter C (see FIG. 3) which is less than diameter I.

Figure 4:
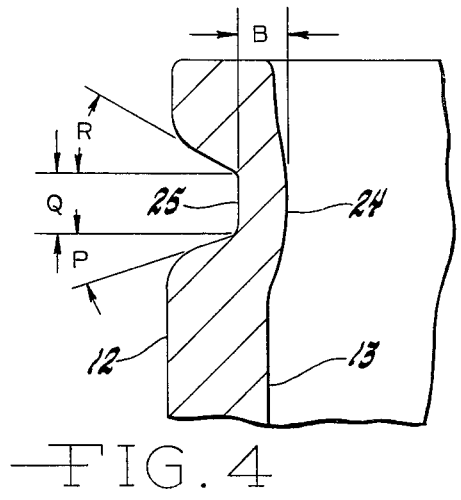
FIG. 4 illustrates a fragmentary sectional view of the groove portion of the FIG. 3 article on an enlarged scale.

During the rolling of the piston boot groove 21 in wall member 11, the second predetermined area, including contour 24 shown in FIG. 4, of surface 13 deforms to predetermined dimensions resulting in a wall thickness B between contour 24 and a flat base 25 of groove 21. Wall thickness B is substantially less than the wall thickness A of the blank 10 shown in FIG. 1. As shown in FIG. 4, the flat base 25 of groove 21 has a width Q which is determined by the dimensions of the flat end portion 20 of roller 19.

The rollers 19, 22 and 23 also serve to control and/or produce the dimensions, such as the wall thickness B, diameters C, D, E, and I, dimension O, groove angles P and R, and a second predetermined dimension Y, of the piston blank 10 during the rolling step. The rolling operation causes the blank 10 to deform as well as to elongate to the dimension Y which is greater than the first predetermined dimension X.

After the rolling step, the process contemplates, at least for producing a brake disc piston, a step of facing off the end surface 26 (see FIG. 2) closest to groove 21 so that the faced off surface 27 (see FIG. 3) is substantially perpendicular or square with respect to the central axis 14 or with respect to that portion of surface 12 having the diameter I. It should also be noted that the facing off step is performed so that the overall dimension parallel to axis 14 is shortened to a third predetermined dimension Z which is less than the initial dimension X of the initial blank 10 shown in FIG. 1.

For producing the piston, after the facing off operation, the piston is subjected to finish grinding. Optionally, thereafter the piston may be polished before it is plated. For a lightweight piston for the front disc brakes of a vehicle, the plating operation should result in an outside surface which is free from longitudinal or spiral tool marks, score marks or nicks which would be detrimental to the functioning of the piston. The plating on the outside surface should also be free from any pitting or frosty surface chrome.

Figure 3:
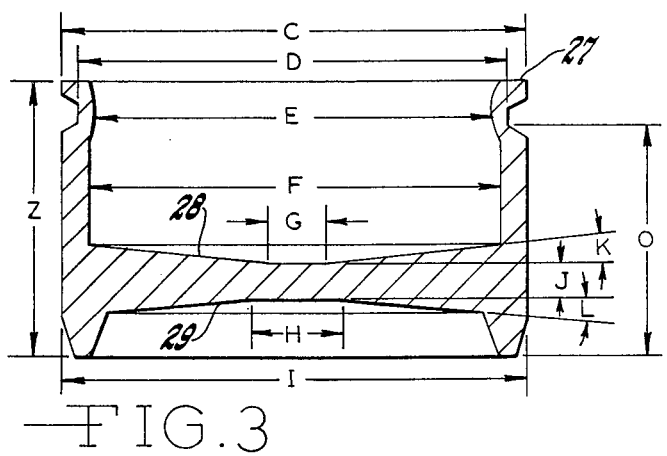
FIG. 3 illustrates a cross-sectional view similar to FIG. 1 but depicting the article after the facing off, finish grinding, polishing, and plating steps have been performed.
Figure 5:
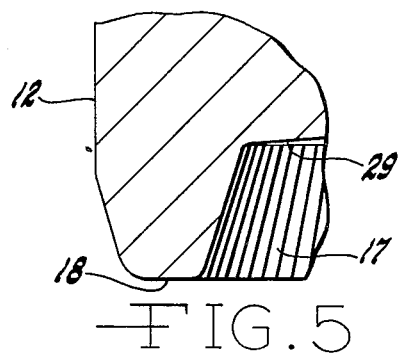
FIG. 5 illustrates a fragmentary cross-sectional view of the piston nose portion of the FIG. 3 article on a magnified scale.

FIGS. 3, 4, and 5 show the piston in its final form. For a particular working embodiment of the present invention, a lightweight front disc brake piston was produced according to the novel process having dimensions and angles as set forth in the following exemplary chart, wherein some dimensions are indicated within a range of inches and angles are indicated in a number of degrees:

| | |
|---|---|
| C | 3.061"–3.081" |
| D | 2.86" |
| E | 2.63" |
| F | 2.770"–2.785" |
| G | 0.30"–0.50" |
| H | 0.60"–0.70" |
| I | 3.0985"–3.1010" |
| J | 0.23"–0.27" |
| K | 5° |
| L | 5° |
| M | 0.40" |
| O | 1.536"–1.556" |
| P | 15° |
| Q | 0.10" |
| R | 30° |
| X | 2.0" |
| Y | 2.07" |
| Z | 1.822"–1.836" |

The shape of the final piston boot groove 21 is shown most clearly in FIG. 4.

The shape of the piston nose 18 is shown most clearly in FIG. 5. The radii and angles of the piston nose 18 should be free of tool marks, nicks, projections, die marks, flat spots, rough plating, or any surface imperfection which could result in damage to the hydraulic seal during the assembly such that subsequent leakage could occur in service.

It should be noted that the transverse portion 15 has its thinnest dimension J in the area of the central axis 14, and has its thickest dimension contiguous with the wall member 11. As shown in FIG. 3, the diameter G is the diameter of a flat circular area on one side of transverse portion 15. The diameter H is the diameter of a larger flat circular area on the other side of transverse portion 15.

From the periphery of such flat circular areas there eminates two conical surfaces 28 and 29 having angles K and L as indicated in FIG. 3. This results in a rather odd shaped transverse portion 15 which surprisingly permits the hollow portions 16 and 17 to be made significantly larger than prior art brake disc pistons, and thereby resulting in a considerable saving in material and a cheaper piston, while at the same time endowing the piston with more than ample structural and functional strength. Indeed, for the particular piston having the dimensions and angles indicated in the chart set forth hereinabove, there results a savings of from ⅝ of a pound to ¾ of a pound of metal with respect to more conventional brake disc pistons. The finished weight of the piston illustrated in FIGS. 3, 4 and 5 and as dimensioned in the chart hereinabove is 1.422 pounds. Such resulting piston can withstand well in excess of 2300 pounds per square inch pressure to which it is exposed in use in a vehicle under normal operating conditions.

The operation of forming the groove 21 by rolling, rather than conventional machining, results in a 33% saving in time to fabricate the piston boot groove 21. The present invention also results in an overall faster cycle time for producing each part, and wherein the rolling operation takes approximately 15 seconds.

It should be noted that the rollers 19, 22 and 23 shown in FIG. 2 are merely for illustrative purposes only, and constitute only one possible way of carrying out the inventive process and achieving the inventive product produced thereby. A unitary composite roller has been employed to accomplish the operations performed by rollers 19 and 22. As another alternative, all three rollers 19, 22 and 23 can be replaced by a single roller having an appropriate configuration to achieve the same dimensions and results as rollers 19, 22 and 23.

Although it has not been found necessary in producing the particular embodiment described hereinabove, the invention also contemplates the use of one or more interior rollers (not shown) if it is desired to control one or more of the interior dimensions, such as diameter E. However, it should be noted that the contour 24 can be and has been actually achieved without any interior rollers.

The present invention should not be limited to a process for producing lightweight, heavy duty steel pistons for front disc brakes of a vehicle. The novel process contemplates and embraces in its broadest forms any process wherein it is desired to make an article having a depression rolled into a substantially curvilinear surface. There may also be embodiments of the present invention which may not require facing off or trimming the elongated wall member 11 as represented by the dimension Y.

The invention should also not be restricted to manufacturing articles fabricated from only hard steel, because the process may be applied with equal facility to other metals, and other substances, such as plastics.

It is also to be understood that the invention is not limited in its application to the details of construction and arrangement of parts as illustrated in the accompanying drawings, because the invention is capable of other embodiments and of being practiced or carried out in various other ways. Also, it is to be understood that the phraseology or terminology employed herein is for the purpose of description and illustration only, and not for the purpose of limitation or restriction.

We claim:

1. A process of manufacturing an article, comprising the steps of:

making a cup-shaped article blank which includes at least one substantially curvilinear wall member having a first substantially curvilinear surface and a second substantially curvilinear surface disposed substantially opposite to said first substantially curvilinear surface, such that said article blank is substantially in the shape of a piston for a disc brake;

rolling a piston boot groove in a first predetermined area of said first substantially curvilinear surface of said substantially curvilinear wall member while permitting a second predetermined area of said second substantially curvilinear surface to deform to predetermined dimensions during said rolling step, said second predetermined area of said second substantially curvilinear surface being disposed substantially opposite to said first predetermined area of said first substantially curvilinear surface;

controlling the dimensions of said article blank during the aforesaid rolling step so that the thickness of said substantially curvilinear wall member between the base of said piston boot groove and said second substantially curvilinear surface is less than the thickness of said substantially curvilinear wall member between said first and second substantially curvilinear surfaces at areas remote from said piston boot groove;

making said article blank wherein said first and second substantially curvilinear surfaces are disposed concentric to a central axis, and wherein said article blank is provided with a transverse portion which is disposed substantially transverse to said central axis and said first and second substantially curvilinear surfaces, said transverse portion having its thinnest dimension adjacent to said central axis and having its thickest dimension contiguous with said substantially curvilinear wall member; and after said rolling step, facing off the end surface closest to said groove so that said faced off surface is substantially perpendicular to said central axis.

2. A process according to claim 1, wherein:

during said rolling step, there is applied to said first substantially curvilinear surface of said substantially curvilinear wall member a first roller, a second roller, and a third roller;

said first roller being applied to said first substantially curvilinear surface in said first predetermined area to form said depression in said substantially curvilinear wall member;

said second roller being disposed to one side of said first roller and being applied to a portion of said first substantially curvilinear surface to maintain a first predetermined diameter of said first substantially curviliear surface during said rolling step; and said third roller being disposed to the opposite side of said first roller and being applied to another portion of said first substantially curvilinear surface to produce therein, during said rolling step, a diameter which is less than said first predetermined diameter.

3. A process according to claim 1, including the steps of:

making said article blank having a first predetermined dimension which is the overall dimension of said article blank parallel to said central axis;

performing said rolling step so that said overall dimension parallel to said central axis is elongated to a second predetermined dimension which is greater than said first predetermined dimension; and performing said facing off step so that said overall dimension parallel to said central axis is shortened to a third predetermined dimension which is less than said first predetermined dimension.

4. A process according to claim 1, for manufacturing a piston for a disc brake, including the steps of:

making said article blank which has a first large open-ended hollow portion a first end thereof, and a second small hollow open-ended portion at the opposite end thereof, said hollow portions being separated by said transverse portion, and having a piston nose radii and angle formed in a portion of said first substantially curvilinear surface which is remote from said first predetermined area of said first substantially curvilinear surface;

rolling said piston boot groove with a flat-ended roller to produce a flat portion in the base of said piston boot groove;

after said facing off step, finish grinding said piston;

and thereafter polishing said piston;

and thereafter plating said piston so that the outside surface thereof is free from longitudinal and spiral tool marks, score marks, and nicks, and so that said piston nose radii and angle are free of tool marks, nicks, projections, die marks, flat spots, and rough plating.

5. An article manufactured in accordance with the process of claim 1.

6. A process according to claim 2, including the steps of:

making said article blank having a first predetermined dimension which is the overall dimension of said article blank parallel to said central axis;

performing said rolling step so that said overall dimension parallel to said central axis is elongated to a second predetermined dimension which is greater than said first predetermined dimension; and performing said facing off step so that said overall dimension parallel to said central axis is shortened to a third predetermined dimension which is less than said first predetermined dimension.

7. An article manufactured in accordance with the process of claim 2.

8. An article manufactured in accordance with the proces of claim 3.

* * * * *